Patented Apr. 18, 1933

1,904,484

UNITED STATES PATENT OFFICE

STANLEY ISAAC LEVY, OF KINGSTON HILL, ENGLAND

METHOD OF REMOVING ARSENIC AND CHLORINE FROM SULPHUR

No Drawing. Application filed January 22, 1931, Serial No. 510,590, and in Great Britain March 15, 1930.

The sulphur liberated from sulphide minerals or compounds by metallurgical or chemical methods, when condensed or precipitated by suitable means, is generally found to contain small quantities of impurities. The impurities usually present are compounds of arsenic, antimony, selenium and other elements contained in the material treated, which form compounds volatile under the conditions of the method used. When chlorination methods are employed to liberate the sulphur, chlorine and chlorine compounds may also remain with the sulphur formed. The presence of these impurities may reduce the market value of the sulphur obtained and may affect the colour.

The object of the present invention is to remove such impurities by cheap, simple and effective means, and to recover the impurities, particularly arsenic, if present in sufficient quantities, in marketable form. Though adapted primarily to deal with sulphur recovered by chlorinating processes, the invention may be applied equally well to sulphur from any source, from which it is desired to remove arsenic and other impurities.

The invention is based on treatment with chlorine or sulphur chloride, by which chlorides of such elements as arsenic, antimony, selenium, etc., are formed and removed by volatilization. It is carried out by adding excess of chlorine or sulphur chloride to the sulphur, removing the volatile chlorides by distillation or scrubbing or both, and finally removing any chlorine remaining in the sulphur as sulphur chloride by treatment with steam.

The invention may be carried out by adding chlorine or sulphur chloride to the sulphur whilst the latter is in the vapour state, or after it has been brought into the liquid condition. In the former case, the volatile chlorides formed will tend to be carried through the sulphur condenser, especially if inert gases are present, but some may condense with the sulphur. We have found, for example, that small proportions of arsenic are tenaciously retained by molten sulphur, even when the arsenic is in the form of the chloride. Whether the chlorine or sulphur chloride is added to the sulphur whilst the latter is in the vapourized or in the liquid condition, therefore, it may be necessary to remove volatile chlorides eventually from the liquid sulphur. This may be effected by a short treatment under very low pressure, for example 25-50 mm. of mercury, or by vigorous scrubbing of the molten sulphur by means of a current of air or inert gas. It is obvious that scrubbing and reduced pressure may be applied at the same time.

A simple method of effecting the scrubbing is to cause the molten sulphur to descend a tower in a finely divided condition against an ascending current of air or inert gas, or to spray it into a chamber through a jet fed by air or inert gas under pressure. The exit gases carrying the volatile chlorides are caused to pass through towers or other scrubbing devices supplied with water or suitable aqueous solution, as a result of which the volatile chlorides are decomposed and oxides or oxy-chlorides precipitated.

If the sulphur to be purified contains more than traces of arsenic, it may be treated in the liquid condition with an excess of sulphur chloride. Part of the arsenic chloride formed distills off, and may be recovered in a suitable condenser. The distillation of the arsenic chloride is facilitated by stirring, by raising the temperature, or by reducing the pressure, or by a combination of these methods. We have found that in the presence of even very small quantities of sulphur chloride, molten sulphur does not become dark and viscous at temperatures above 160°, as is the case with pure sulphur, but remains mobile and limpid, so that it may easily be stirred at temperatures otherwise within the range of high viscosity. Even at elevated temperatures and reduced pressures, traces of arsenic chloride may be retained, so that it is generally desirable, if complete freedom from arsenic is required, to apply the scrubbing treatment with air or inert gas, after most of the arsenic chloride has been distilled off.

Whilst arsenic and antimony, if present in proportions which justify recovery, may be easily removed for the most part by treatment with only slight excess of chlorine or sulphur chloride, followed by volatilization and treatment of the vapours driven off, selenium is not completely removed unless a considerable excess of chlorine or sulphur chloride is employed. If this element is to be removed, therefore, it is best to treat the sulphur in a molten condition by agitating with a considerable excess of sulphur chloride, say from one-quarter to one-half of the weight of sulphur to be purified. Most of the unchanged sulphur chloride, carrying the arsenic, antimony, selenium, etc. is then removed, preferably under reduced pressure. The distillate may be fractionated, or agitated with a little hot water, according to the nature of the impurities present, to recover most of the sulphur chloride for further use. The molten sulphur is then scrubbed with air or inert gas as before, or subjected for a short time to a relatively low pressure, say 20–25 mm. of mercury, to remove the last traces of the impurities present.

After complete removal of the other impurities, the sulphur still contains traces of sulphur chloride, which must be removed if a high grade product is required. To effect this removal, the molten sulphur is thoroughly scrubbed with steam, either in a jet or in towers, as in the previous scrubbing with air or inert gas. The purified molten product so obtained is filtered if necessary through a suitable filter of sand, asbestos, metal gauze, or linen or other filter cloth, and is then completely free from the last traces of impurities and chlorine. The product so obtained is of a very high degree of purity, and of very good colour.

I claim:

1. A process of removing impurities such as arsenic, antimony, selenium, etc., from sulphur consisting in adding a medium serving to form volatile chlorides with the impurities and removing the volatile chlorides formed.

2. A process of removing impurities from sulphur consisting in adding thereto a chlorinating medium capable of forming with the impurities volatile chlorides such chlorinating medium being in excess of that necessary for the reaction, removing the volatile chlorides formed and subjecting the molten sulphur to the action of steam to free it from traces of sulphur chloride.

3. A process of purifying sulphur consisting in adding thereto chlorine in excess of that necessary to react with the impurities present to form volatile chlorides, removing the volatilizable substances present, subjecting the molten sulphur to the action of steam to free it from traces of sulphur chloride and filtering the purified sulphur in the molten condition.

4. A process of purifying sulphur consisting in adding thereto sulphur chloride in excess of that necessary to react with the impurities present to form volatile chlorides removing the volatilizable substances present, subjecting the molten sulphur to the action of steam to free it from traces of sulphur chloride and filtering the purified sulphur in the molten condition.

5. A process of removing the impurities from sulphur consisting in treating the sulphur in the vapour form with a chlorinating medium capable of converting the impurities to volatile chlorides in excess of that necessary for the reaction, fractionating the product to remove the volatile chlorides, and eliminating any sulphur chloride in the molten sulphur by means of steam.

6. A process of removing the impurities from sulphur consisting in treating the sulphur in the vapour form with a chlorinating medium capable of converting the impurities to volatile chlorides in excess of that necessary for the reaction, scrubbing the product to remove volatile chlorides, and eliminating any sulphur chloride in the sulphur by means of steam.

7. A process of removing the impurities from sulphur consisting in treating the sulphur in the vapour form with a chlorinating medium capable of converting the impurities to volatile chlorides in excess of that necessary for the reaction, fractionating and scrubbing the product to remove the volatile chlorides, and eliminating any sulphur chloride in the sulphur by means of steam.

8. A process of removing the impurities from sulphur consisting in treating the sulphur in the liquid form with a chlorinating medium capable of converting the impurities into volatile chlorides in excess of that necessary for the reaction, fractionating the product to remove the volatile chlorides, and eliminating any sulphur chloride in the sulphur by means of steam.

9. A process of removing the impurities from sulphur consisting in treating the sulphur in the liquid form with a chlorinating medium capable of converting the impurities into volatile chlorides in excess of that necessary for the reaction, scrubbing the product to remove the volatile chlorides, and eliminating any sulphur chloride in the sulphur by means of steam.

10. A process of removing the impurities from sulphur consisting in treating the sulphur in the liquid form with a chlorinating medium capable of converting the impurities into volatile chlorides in excess of that necessary for the reaction, fractionating and scrubbing the product to remove the volatile chlorides, and eliminating any sulphur chloride in the sulphur by means of steam.

11. A process of purifying sulphur consisting in treating the sulphur with a chlorinating medium capable of converting the impurities into volatile chlorides for example chlorine or sulphur chloride, in excess of that necessary for the reaction, fractionating the product to remove the bulk of the volatile chlorides, removing any volatile chlorides remaining by subjecting to reduced pressure, and eliminating any sulphur chloride remaining in the sulphur by means of steam.

12. In a process of purifying sulphur and recovering arsenic, antimony, etc., treating the sulphur with a chlorinating medium in slight excess of that required to form chlorides of arsenic, antimony, etc., distilling off and condensing the bulk of the arsenic and other volatile compounds formed, and removing the remainder of the arsenic and other chlorides from the molten sulphur by reduced pressure.

13. In a process of purifying sulphur and recovering arsenic, antimony, etc., treating the sulphur with a chlorinating medium in slight excess of that required to form chlorides of arsenic, antimony, etc., distilling off and precipitating the bulk of the arsenic and other volatile compounds formed, and removing the remainder of the arsenic and other chlorides from the molten sulphur by reduced pressure.

14. In a process of purifying sulphur and recovering arsenic, antimony, etc., treating the sulphur with a chlorinating medium in slight excess of that required to form chlorides of arsenic, antimony, etc., distilling off and condensing the bulk of the arsenic and other volatile compounds formed, and removing the remainder of the arsenic and other chlorides from the molten sulphur by scrubbing.

15. In a process of purifying sulphur and recovering arsenic, antimony, etc., treating the sulphur with a chlorinating medium in slight excess of that required to form chlorides of arsenic, antimony, etc., distilling off and precipitating the bulk of the arsenic and other volatile compounds formed, and removing the remainder of the arsenic and other chlorides from the molten sulphur by reduced pressure.

16. In a process of purifying sulphur and recovering arsenic, antimony, etc. treating the sulphur with a chlorinating medium in slight excess of that required to form chlorides of arsenic, antimony, etc., distilling off and precipitating the bulk of the arsenic and other volatile compounds formed, and removing the remainder of the arsenic and other chlorides from the molten sulphur by scrubbing.

17. In a process of purifying sulphur and recovering arsenic, antimony, etc., treating the sulphur with a chlorinating medium in slight excess of that required to form chlorides of arsenic, antimony, etc., distilling off and condensing the bulk of the arsenal and other volatile compounds formed, and removing the remainder of the arsenic and other chlorides from the molten sulphur by scrubbing and reduced pressure.

18. In a process of purifying sulphur and recovering arsenic, antimony, etc., treating the sulphur with a chlorinating medium in slight excess of that required to form chlorides of arsenic, antimony, etc., distilling off and precipitating the bulk of the arsenic and other volatile compounds formed, and removing the remainder of the arsenic and other chlorides from the molten sulphur by scrubbing and reduced pressure.

19. In a process of purifying sulphur and recovering inter alia selenium, agitating the sulphur in molten condition with a chlorinating medium considerably in excess of that required to convert the impurities into volatile chlorides, removing the unchanged sulphur chloride, together with compounds of arsenic, selenium, etc., fractionating the distillate to recover sulphur chloride, then removing traces of arsenic and finally purifying the sulphur by scrubbing with steam.

In testimony whereof I have signed my name to this specification.

STANLEY ISAAC LEVY.